(12) United States Patent
Girbinger et al.

(10) Patent No.: US 8,944,512 B2
(45) Date of Patent: Feb. 3, 2015

(54) APPARATUS FOR CONTINUOUS INCLINATION ADJUSTMENT OF A PIVOTABLE VEHICLE PART

(75) Inventors: Joerg Girbinger, Amberg (DE); Erwin Himmelhuber, Sulzbach-Rosenberg (DE)

(73) Assignee: Grammer AG, Amberg (DE)

( * ) Notice: Subject to any disclaimer, the term of this patent is extended or adjusted under 35 U.S.C. 154(b) by 222 days.

(21) Appl. No.: 13/446,623

(22) Filed: Apr. 13, 2012

(65) Prior Publication Data

US 2012/0261970 A1    Oct. 18, 2012

(30) Foreign Application Priority Data

Apr. 14, 2011    (DE) .................. 10 2011 017 083

(51) Int. Cl.
*B60N 2/46*    (2006.01)
(52) U.S. Cl.
CPC .................................. *B60N 2/4633* (2013.01)
USPC ............. 297/411.38; 297/411.32; 297/411.35
(58) Field of Classification Search
CPC .... A47C 7/543; B60N 2/4606; B60N 2/4626; B60N 2/4633
USPC .............. 297/411.32, 411.35, 411.28, 411.38
See application file for complete search history.

(56) References Cited

U.S. PATENT DOCUMENTS

| 6,609,758 | B1* | 8/2003 | Lefevere | 297/411.38 |
| 6,805,513 | B2* | 10/2004 | Marquina | 403/107 |
| 7,108,328 | B2* | 9/2006 | Himmelhuber et al. | 297/411.38 |
| 7,284,799 | B2* | 10/2007 | Chung | 297/411.38 |
| 2009/0284034 | A1* | 11/2009 | Nuss et al. | 296/1.07 |

FOREIGN PATENT DOCUMENTS

WO    WO2010/020899    2/2010

* cited by examiner

*Primary Examiner* — Philip Gabler
(74) *Attorney, Agent, or Firm* — Lowe Graham Jones PLLC (57) ABSTRACT

The invention relates to an apparatus for continuous inclination adjustment of a component part of a vehicle, in particular a pivotable vehicle armrest, pivotable about a pivot axle. The apparatus is configured to lock various angles of inclination in a first pivoting direction and unlock them when a pre-settable angle of inclination is reached and/or exceeded. This allows the pivotable component part of the vehicle to be moved back into a starting position contrary to the first pivoting direction. The continuous inclination adjustment apparatus has a sleeve freewheel device for setting the continuous inclination, a coupling device for coupling and uncoupling the sleeve freewheel device and a control device for actuating the coupling device.

20 Claims, 4 Drawing Sheets

APPARATUS FOR CONTINUOUS INCLINATION ADJUSTMENT OF A PIVOTABLE VEHICLE PART

PRIORITY CLAIM

This application claims the benefit of German Application Serial No. 102011017083.9 filed on Apr. 14, 2011, contents of which are incorporated herein.

FIELD OF THE INVENTION

The invention relates to an apparatus for continuous inclination adjustment of a component part of a vehicle, in particular a pivotable vehicle armrest pivotable about a pivot axle, further configured to lock various angles of inclination in a first pivoting direction and unlock the various angles of inclination when a pre-settable angle of inclination is reached and/or exceeded so that the pivotable component part of the vehicle can be moved back into a starting position contrary to the first pivoting direction. In addition, the invention relates to a pivotable vehicle armrest or a pivotable vehicle table.

BACKGROUND OF THE INVENTION

Generic apparatus for the continuous inclination adjustment of a pivotable component part of a vehicle are already known from the prior art, in particular with respect to armrests on a vehicle seat.

For example, an armrest with an inclination adjustment means, which comprises an armrest body pivotable in a settable manner about a horizontal axle between a raised and a lowered position, is known from the European Patent Specification EP 1 530 523 B1. The armrest body has associated with it a self-locking gear mechanism which locks only during the downward swivel and which has a primary part which is connected in a rotatable manner to the armrest body and which is rotatable about the horizontal axle and with which a secondary part—held in a rotatably fixed manner at least to a limited extent with respect to the horizontal axle co-operates.

In this case the self-locking gear mechanism embodies means for locking different angles of inclination in a first pivoting direction of the armrest body.

The self-locking gear mechanism has associated with it a control device which is designed in the form of a means for discontinuing the locking and which in the raised position and at the beginning of the downward swivel of the armrest body separates the primary part and the secondary part from each other and in the region of the lowered position sets them in engagement with each other again, in which case the primary part and the secondary part form sets of spur gears facing one another and arranged coaxially with the axle substantially in the manner of a spur-gear coupling, and the primary part or the secondary part is axially movable, and in which case the control device setting the primary part and the secondary part in or out of engagement forms at least one control cam rotating with the primary part or at least one control path rotating with the primary part and, correlating with it, at least one control path fixed with respect to the secondary part or at least one control cam fixed with respect to the secondary part.

In this case at least one compression spring presses the sets of spur gears of the primary part and the secondary part against each other, and an abutment prevented from being shifted axially on the axle limits an axial displacement of the primary part or of the secondary part, the primary part being arranged in an axially fixed manner on the axle and the secondary part being arranged in a movable manner on the axle, the abutment being arranged on the side remote from the set of spur gears of the secondary part, and the at least one compression spring being arranged between the secondary part and the abutment.

Despite a space-saving design the armrest withstands even high loads by means of the inclination adjustment means described above and thus permits a reliable operation. However, the inclination adjustment means still has a relatively complicated design.

SUMMARY OF THE INVENTION

The present invention is directed to providing an apparatus for generic inclination adjustment that has a considerably more compact and space-saving design, in particular with respect to its radial extension. This attained by continuous inclination adjustment of a component part of a vehicle, in particular a pivotable vehicle armrest, pivotable about a pivot axle, configured to lock various angles of inclination in a first pivoting direction and unlock when a pre-settable angle of inclination is reached and/or exceeded. In a preferred embodiment, the pivotable component part of the vehicle can be moved back into a starting position contrary to the first pivoting direction. In addition, the continuous inclination adjustment apparatus preferably includes a sleeve freewheel device for setting the continuous inclination, a coupling device for coupling and uncoupling the sleeve freewheel device and a control device for actuating the coupling device.

The coupling device is preferably arranged between the sleeve freewheel device and the control device, thus resulting in a particularly simple design.

The sleeve freewheel device represents a preferred feature of the invention since with this it is possible for the present continuous inclination adjustment means to be designed in a particularly compact and space-saving manner radially.

It is preferable for the continuous inclination adjustment means to have two sleeve freewheel devices arranged axially adjacent to each other in the direction of the pivot axle, as a result of which forces introduced into the pivotable component part of the vehicle can be introduced into the mechanism of the continuous inclination adjustment means over a particularly wide area.

Since sleeve freewheel devices of this type are well known from the prior art and standardized sleeve freewheel devices can be used in the present case in an advantageous manner, the manner of operation of the present sleeve freewheel device will not be described in detail.

In all events it is possible to dispense with complicated in-house designs for suitable locking devices in an advantageous manner in the present case.

The sleeve freewheel device is interposed between the component part of the vehicle pivotable about a pivot axle and a further component part of the vehicle preferably stationary with respect to the pivot axle or a component of the component part thereof, in such a way that it is suitable for pivoting the pivotable component part of the vehicle in a first pivoting direction about the pivot axle and thus relative to the further component part of the vehicle. In this case the pivotable component part of the vehicle can be locked virtually in any desired angle of inclination until a pre-set angle of inclination is reached and/or exceeded. Only then does a release of the sleeve freewheel device take place, so that the pivotable component part of the vehicle can be pivoted back again in the opposite pivoting direction.

In this case the release is carried out by means of the co-operation of the control device, by means of which the coupling device is actuated when the pre-set angle of inclination is reached or exceeded respectively.

In this respect, according to the invention the continuous inclination adjustment means additionally comprises a suitable coupling device for coupling or uncoupling the sleeve freewheel device, in particular from the further component part of the vehicle, relative to which the pivotable component part of the vehicle is mounted in a pivotable manner. In this respect a basic locking function of the sleeve freewheel device can remain untouched. Only in this way is the use of commercially available sleeve freewheel devices possible.

The coupling device can be actuated right away by means of the control device in a manner dependent upon the angle of inclination of the pivotable vehicle part, so that in the present case too any further manual actuation of the coupling device is not necessary.

In order to reduce, in particular, the structural space of the present inclination adjustment means required radially, according to the invention the coupling device is arranged between the sleeve freewheel device and the control device.

In this case, the control device is arranged outside the coupling device, so that the coupling device can have a very compact design.

In the sense of the invention the term "pivot axle" describes a rigid shaft of the continuous inclination adjustment means, on which the present component parts or groups of component parts of the continuous inclination adjustment means can be mounted so as to be movable, in particular, in a rotational and/or translational manner.

It is to be understood that the continuous inclination adjustment means can be used in or on a vehicle with respect to a plurality of possible pivotable component parts of the vehicle which are to be set in a continuous manner with respect to an angle of inclination.

It is particularly advantageous for the continuous inclination adjustment means to be able to be used in conjunction with a pivotable vehicle armrest or a pivotable vehicle table.

In this respect the invention is also attained by a pivotable vehicle armrest of this type or a pivotable vehicle table of this type with the continuous inclination adjustment means according to the invention in accordance with any one of the features described here.

In addition, the invention may be attained by a vehicle, a driver's cab of a vehicle and/or a vehicle seat with the inclination adjustment means according to the invention in accordance with any one of the features described here.

The continuous inclination adjustment means can be designed in a particularly simple manner if the sleeve freewheel device, the coupling device and the control device are arranged axially adjacent to one another along the pivot axle. As a result of this, the continuous inclination adjustment means can have an even more compact design radially.

A particularly advantageous variant of embodiment provides that the sleeve freewheel device comprises a set of radially locking teeth and the coupling device comprises a set of axially locking teeth, the set of radially locking teeth and the set of axially locking teeth acting in opposed rotary locking directions. As a result, it can be structurally simple to prevent the coupling device from being inadvertently released if the sleeve freewheel device locks during loading of the pivotable component part of the vehicle.

Coupling and uncoupling of the coupling device can be carried out particularly satisfactorily when the coupling device has a set of axially locking teeth with a first coupling element with spur toothing and with a second coupling element with spur toothing, the two coupling elements being mounted along the pivot axle in such a way that the two coupling elements are capable of being axially separated from each other by means of the control device.

An axial separation of the two coupling elements in this way can be implemented in a structurally very simple manner if the control device has a control disc with axially projecting wedge elements which communicate with wedge grooves of an axially displaceable coupling element of the coupling device. In this respect the two coupling elements with spur toothing are pulled away from each other axially with the aid of the control device.

If the control disc is rotated in a suitable manner about the pivot axle in this case, the axially projecting wedge elements can be shifted in the wedge grooves in such a way that the axially displaceable coupling element can be driven in the longitudinal extension of the pivot axle.

The control disc remains axially in its existing position, and thus is not displaced axially along the pivot axle.

It is to be understood that, instead of the wedge elements, it is also possible for elements shaped in a different manner to be used.

In this case, however, it is particularly advantageous for a rotational movement about the pivot axle to be converted into a translational movement along the pivot axle by means of the control disc, since in this case a control device can be provided in a small structural space for the present coupling device.

In particular, in this connection the control device to have a control disc with a control groove which is arranged radially and extends in the peripheral direction of the control disc and in which is arranged an entrainment cam, in which case a length of the control groove in the peripheral direction of the control disc pre-sets an angle of inclination of the pivotable component part of the vehicle capable of being used to the maximum degree.

In this case the entrainment cam preferably extends radially starting from the pivot axle and it rotates in a manner corresponding to the angle of inclination of the pivotable component part of the vehicle in the peripheral direction of the pivot axle. In this respect the entrainment cam embodies a mechanical signal element for indicating the angle of inclination with respect to the coupling device.

It is preferable for the entrainment cam to be arranged at an axial distance from the set of axially locking teeth of the coupling device, so that it is not necessary for structural space to be reserved for the arrangement of the entrainment cam in particular in the region of the set of axial teeth.

It is to be understood that a plurality of control grooves and a corresponding number of entrainment cams can be provided on the control disc, in order to be able to ensure a more homogeneous introduction of force into the control disc and further into the wedge grooves.

It is also to be understood that the control disc can alternatively also be provided with a control pin or the like instead of with the control groove, in order to be able to carry out the present manner of operation. The control pin could then be entrained with a accordingly rotatable control groove.

A further preferred variant of embodiment provides that the first coupling element with spur toothing has a spring-stressed coupling sleeve which is mounted so as to be axially displaceable along the pivot axle.

An axial hinge, which can be activated by the control device, between the control device and the coupling device can be provided in a structurally simple manner by means of the coupling sleeve which is mounted so as to be axially displaceable.

It is preferable, in particular, for the control device to be mounted at least in part on the axially displaceable coupling sleeve, as a result of which further structural space can be saved.

In addition, it is advantageous for the second coupling element with spur toothing to have a coupling sleeve which is fixed axially to the pivot axle. In this respect the coupling device can be held in a manner fixed translationally in part with respect to the pivot axle, so as to rule out the risk of the second coupling element with spur toothing being able to trail behind the first coupling element with spur toothing during an uncoupling procedure.

In order also to be able to save further structural space particularly in the region of the second coupling element with spur toothing it is preferable for the sleeve freewheel device to be mounted on the axially fixed coupling sleeve.

At this point it should be further mentioned that it is preferable for the sleeve freewheel device, and preferably two sleeve freewheel devices, to be arranged between an outer sleeve of the continuous inclination adjustment means and a coupling sleeve of the coupling device, since the sleeve freewheel device can be positioned in the continuous inclination adjustment means in a particularly well protected manner in this case.

At the same time the outer sleeve can advantageously be protected from outside influences for example by a cylindrical tube which is characterized by a device for receiving the pivotable component part of the vehicle.

Further advantages, aims and properties of the present invention are explained with reference to the accompanying drawing and the following description, in which an apparatus for the continuous inclination adjustment of a component part of the vehicle pivotable about a pivot axle and with a sleeve freewheel device for the continuous inclination adjustment, with a coupling device for coupling and uncoupling the sleeve freewheel device and with a control device for actuating the coupling device is described by way of example, the coupling device being arranged between the sleeve freewheel device and the control device.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
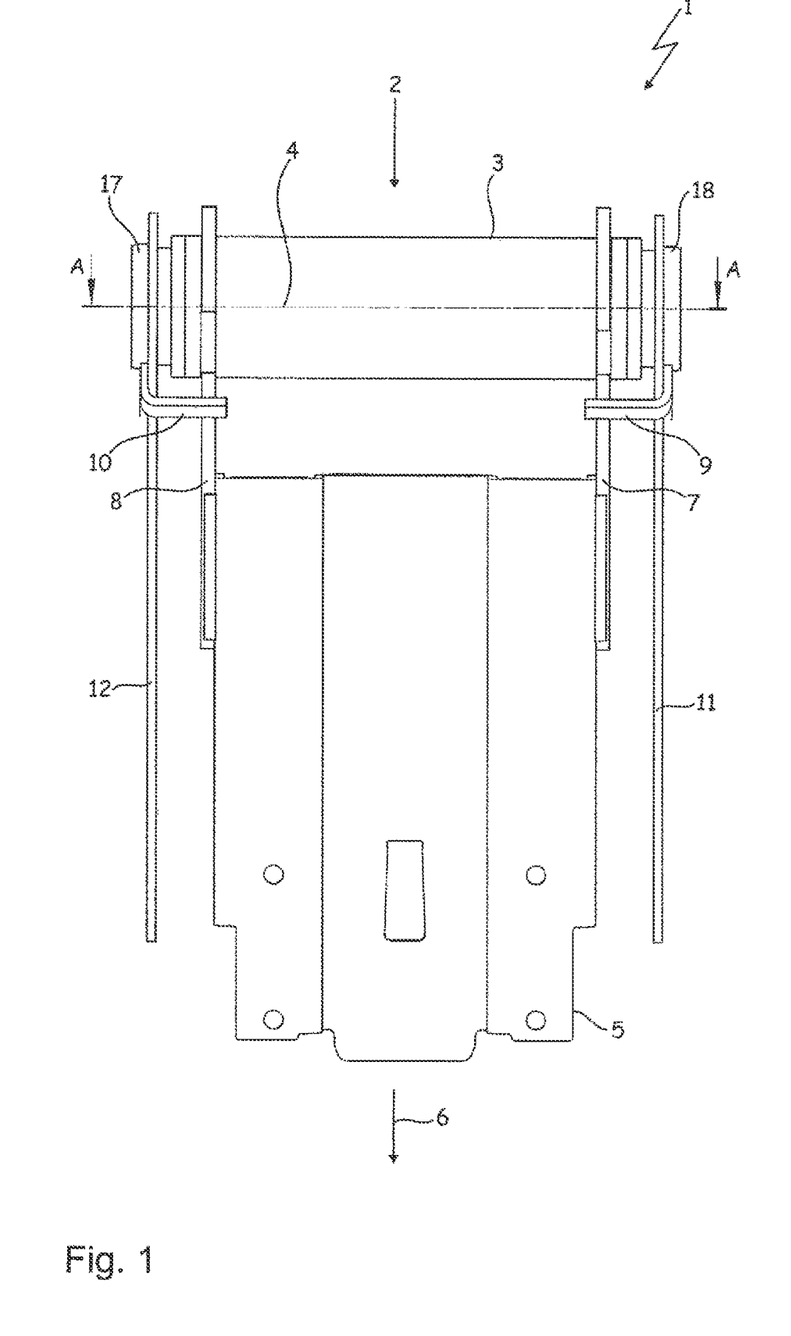
FIG. 1 is a diagrammatic view from below of a continuous inclination adjustment means with a component part of the vehicle pivotable about a pivot axle.

The continuous inclination adjustment means 1 shown in FIG. 1 comprises a continuous adjustment mechanism 2 (see FIGS. 2 to 10) which is arranged in a protected manner in an outer sleeve 3.

In addition, the continuous inclination adjustment means 1 comprises a component part of the vehicle 5 which is pivotable about a pivot axle 4 and which is fastened to a right-hand pivot arm 7 and a left-hand pivot arm 8 as viewed in the direction of travel of the vehicle 6. The two pivot arms 7 and 8 can retain on stop elements 9 and 10 of an end stop of the continuous inclination adjustment means 1.

The continuous inclination adjustment means 1 is supported on the side of the vehicle by a right-hand bearing block 11 and a left-hand bearing block 12 and is connected by way of the latter in a fixed manner to a vehicle chassis (not shown here). In this respect the pivotable component part of the vehicle 5 can be pivoted relative to the bearing blocks 11 and 12, the bearing blocks 11 and 12 embodying stationary component parts of the vehicle and additionally embracing the two stop elements 9 and 10.

Figure 2:
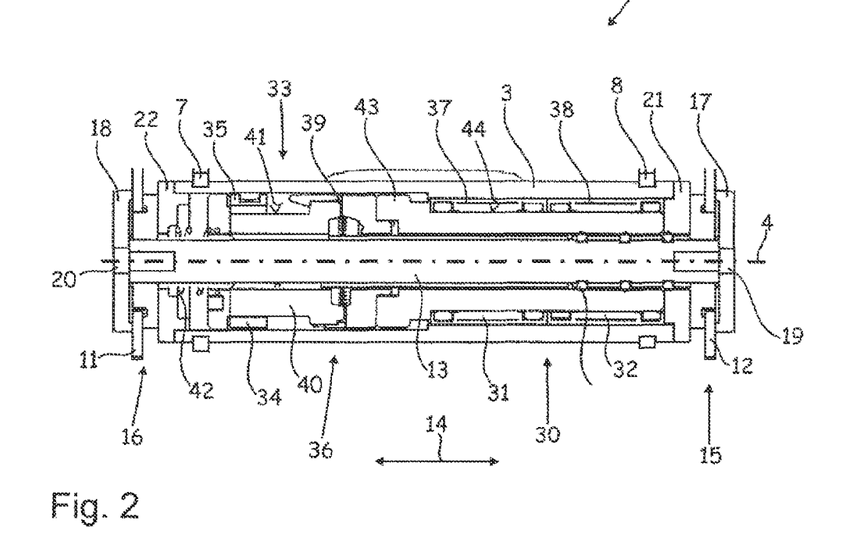
FIG. 2 is a diagrammatic longitudinal section extending along the section plane A-A of the continuous inclination adjustment means shown in FIG. 1.

As is evident from the sectional illustration according to FIG. 2, the two pivot arms 7 and 8 are fastened to the outer sleeve 3 in a manner preventing rotation.

The pivot axle 4 comprises a profiled shaft 13 with an axial longitudinal extension 14, a terminal locking washer 17 and 18 respectively being flange-mounted as axial securing means in each case on the profiled shaft 13 by means of a screw fastening 19 and 20 respectively at the axial ends 15 and 16 of the profiled shaft 13.

The outer sleeve 3 is closed axially by a first cover disc 21 and by a second cover disc 22, the profiled shaft 13 extending through the two cover discs 21 and 22. The two cover discs 21 and 22 are clamped to the outer sleeve 3 by means of the screw fastenings 19 and 20.

In addition, the continuous inclination adjustment means 1 has means 30 for locking different angles of inclination (see in particular FIGS. 4 and 6, reference numbers 55A and 56A), which in this embodiment comprise a first sleeve freewheel device 31 and a second sleeve freewheel device 32.

The two sleeve freewheel devices 31 and 32 are pressed into the outer sleeve 3 so that forces occurring at the continuous inclination adjustment means 1 can be transmitted in a play-free manner between the outer sleeve 3 and the two sleeve freewheel devices 31 and 32.

Figure 4:
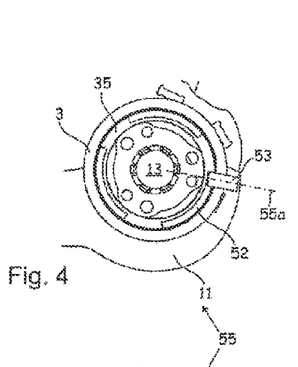
FIG. 4 is a diagrammatic cross-section extending along the section plane B-B of the continuous inclination adjustment means shown in FIGS. 1 to 3 in a starting position with an angle of inclination of 0°.
Figure 5:
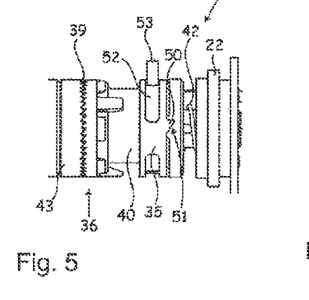
FIG. 5 is a diagrammatic detailed partial view of the continuous inclination adjustment means shown in FIGS. 1 to 4 in the starting position.

Furthermore, the continuous inclination adjustment means 1 has means 33 for discontinuing the locking when a pre-settable angle of inclination (57A, see FIG. 8) is reached and/or exceeded, so that the pivotable component part of the vehicle 5 can be pivoted back again into a starting position (see FIGS. 4 and 5, reference number 55).

In this embodiment the means 33 for discontinuing the locking comprise a control device 34 with a control disc 35, as is explained in greater detail below.

A coupling device 36 for coupling and uncoupling the sleeve freewheel devices 31 and 32 is arranged between the sleeve freewheel devices 31 and 32 and the control device 34, in which case it is possible for the coupling device 36 to be actuated by means of the control device 34. In this way, the conventional sleeve freewheel devices 31 and 32 need not be modified structurally in order to be able to discontinue their locking function in the sense of the invention. The coupling device 36 is provided to this end.

The sleeve freewheel devices 31, 32, the coupling device 36 and the control device 34 are arranged adjacent to one another along the pivot axle 4 and in the longitudinal extension 14 of the profiled shaft 13, as a result of which the continuous inclination adjustment means 1 has a particularly narrow design radially, in particular with respect to its adjustment mechanism 2.

The sleeve freewheel devices 31 and 32 each have a set of radially locking teeth 37 and 38 respectively and the coupling device 36 has a set of axially locking teeth 39, the sets of radially locking teeth 37 and 38 respectively and the set of axially locking teeth 39 acting in opposed rotary locking directions for example with respect to the peripheral direction of the outer sleeve 3.

In the present case the coupling device 36 is provided on the one hand with a first coupling element with spur toothing 40 which is designed in the form of a coupling sleeve 41 mounted in an axially displaceable manner on the profiled shaft 13 along the pivot axle 4.

The coupling sleeve 41 mounted in an axially displaceable manner is acted upon in this case in a spring-loaded manner by means of a compression spring 42 which is supported on the second cover disc 22. On the other hand the coupling device 36 is provided with a second coupling element with spur toothing 43 which is designed in the form of a coupling sleeve 44 fixed axially to the profiled shaft 13.

The axially fixed coupling sleeve 44 runs in a play-free manner with respect to the sleeve freewheel devices 31 and 32 and it can be rotated in both directions of rotation on the profiled shaft 13.

The coupling sleeve 41 mounted in an axially displaceable manner is constantly pressed by the compression spring 42 against the axially fixed coupling sleeve 44, so that the set of axially locking teeth 39 is always closed or activated provided that the control device 34 does not discontinue this. This prevents, in co-operation with the sleeve freewheel devices 31 and 32 the pivotable component part of the vehicle 5 from being able to be pressed downwards from a locked angle of inclination (see FIGS. 4 and 6, reference numbers 55A and 56A).

The sleeve freewheel devices 31 and 32 are mounted radially on the outside on the axially fixed coupling sleeve 44 in a space-saving manner, while the control device 34 is arranged at least in part radially on the outside on the axially displaceable coupling sleeve 41.

In this embodiment both the first coupling element with spur toothing 40 and the second coupling element with spur toothing 43 are designed in each case in a plurality of parts in the form of a group of component parts, but they can also be designed in one piece.

Three O-rings 45 (numbered only by way of example in this case) are provided as a cover brake between the profiled shaft 13 and the axially fixed coupling sleeve 44.

Figure 3:
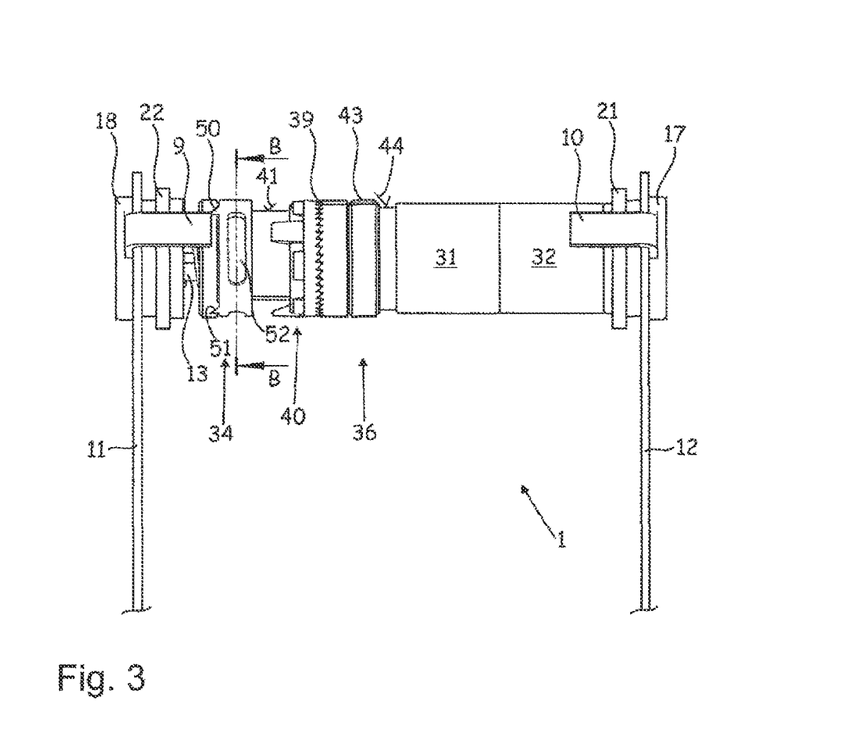
FIG. 3 is a diagrammatic detailed view of the continuous inclination adjustment means shown in FIGS. 1 and 2 without an outer sleeve.

The control disc 35 already mentioned above has axially projecting wedge elements 50 (numbered only by way of example in this case, see in particular FIG. 3) which engage in wedge grooves 51 in the coupling sleeve 41 mounted in an axially displaceable manner.

In addition, the control disc 35 has control grooves 52 (numbered only by way of example in this case) arranged radially and extending in the peripheral direction, in an entrainment cam 53 (see FIGS. 4 to 9) projecting radially into at least one of the control grooves 52.

The entrainment cam 53 is moved or positioned in a manner corresponding to the set inclination of the pivotable component part of the vehicle 5. To this end the entrainment cam 53 is fastened in particular in the outer sleeve 3 and passes through it radially, as is clearly evident in the illustrations according to FIGS. 4, 6 and 8.

Figure 8:
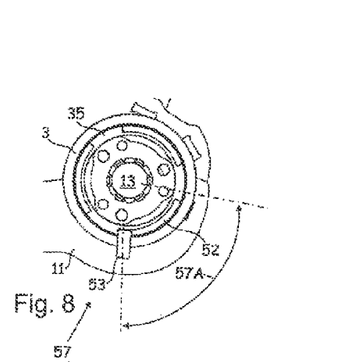
FIG. 8 is a further diagrammatic cross-section extending along the section plane B-B of the continuous inclination adjustment means shown in FIGS. 1 to 7 in a return position with an angle of inclination of 85°.
Figure 9:
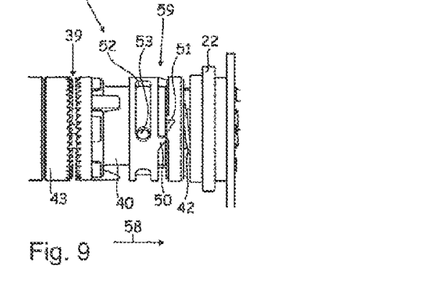
FIG. 9 is a further diagrammatic detailed partial view of the continuous inclination adjustment means shown in FIGS. 1 to 8 in the return position.

If the control disc 35 is entrained by the entrainment cam 52, since the latter has arrived at one end of the control groove 52, the control disc 35 rotates about the pivot axle 4 with the entrainment cam 52 (see FIGS. 8 and 9). In this case the control disc 35 remains axially in its place. The rotation of the control disc 35 has the effect, however, that the axially projecting wedge elements 50 are shifted with respect to the wedge grooves 51, as a result of which the coupling sleeve 41 mounted in an axially displaceable manner is shifted towards the compression spring 42. As a result, the set of axially locking teeth 39 is rendered inoperative and the sleeve freewheel devices 31 and 32 are released, so that the pivotable component part of the vehicle can be pivoted back again.

As shown by the illustrations according to FIGS. 4 and 5 the continuous inclination adjustment means 1 is in a starting position 55 with an angle of inclination 55A of 0°. In this case the set of axially locking teeth 39 of the coupling device 36 is in engagement.

Figure 6:
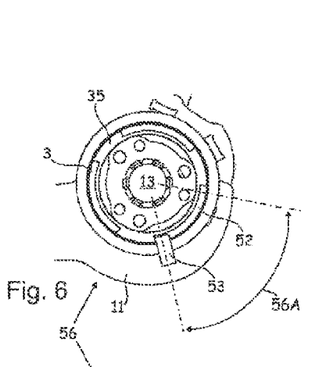
FIG. 6 is a further diagrammatic cross-section extending along the section plane B-B of the continuous inclination adjustment means shown in FIGS. 1 to 5 in a locking position with an angle of inclination of 65°.
Figure 7:
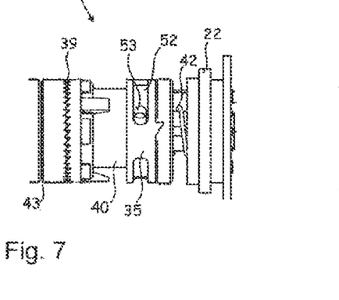
FIG. 7 is a further diagrammatic detailed partial view of the continuous inclination adjustment means shown in FIGS. 1 to 6 in the locking position.

As shown by the illustrations according to FIGS. 6 and 7 the continuous inclination adjustment means 1 is in a locking position 56 with an angle of inclination 56A of 65°, in which the set of axially locking teeth 39 is still in engagement.

As shown by the illustrations according to FIGS. 8 and 9 the continuous inclination adjustment means 1 is in a return position 57 with an angle of inclination 57A of 85°, in which the first coupling element with spur toothing 40 is disengaged in the direction of the arrow 58 in the manner of an axial hinge 59 by approximately 2.5 mm axially contrary to the force of the compression spring 42 and the set of axially locking teeth 39 is released accordingly.

In this case it is also clearly evident that the axially projecting wedge elements 50 are shifted completely out of the respective wedge groove 51 by the rotational movement of the control disc 35. The pivotable component part of the vehicle 5 can thus be pivoted into its starting position 55 again.

Figure 10:
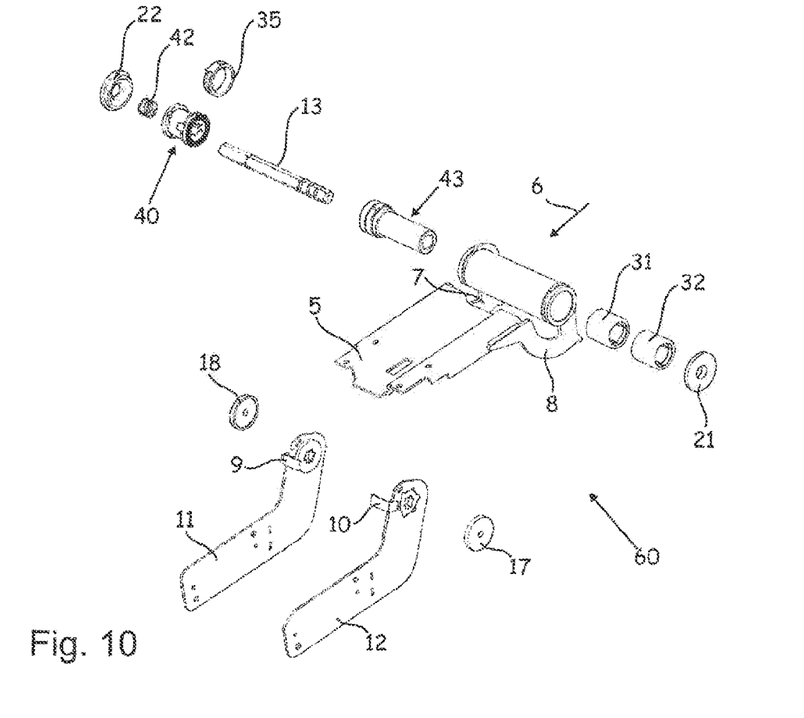
FIG. 10 is a diagrammatic exploded view of the continuous inclination adjustment means shown in FIGS. 1 to 9.

As shown by the illustration according to FIG. 10 the continuous inclination adjustment means 1 is additionally shown in an exploded view 60, in which case the continuous inclination adjustment means 1 is not explained once again in this respect in order to avoid repetition.

Figure 11:
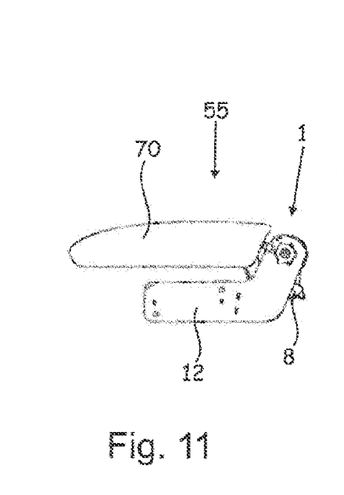
FIG. 11 is a diagrammatic side view of a vehicle armrest with the continuous inclination adjustment means in the starting position according to FIGS. 4 and 5.
Figures 12, 13:
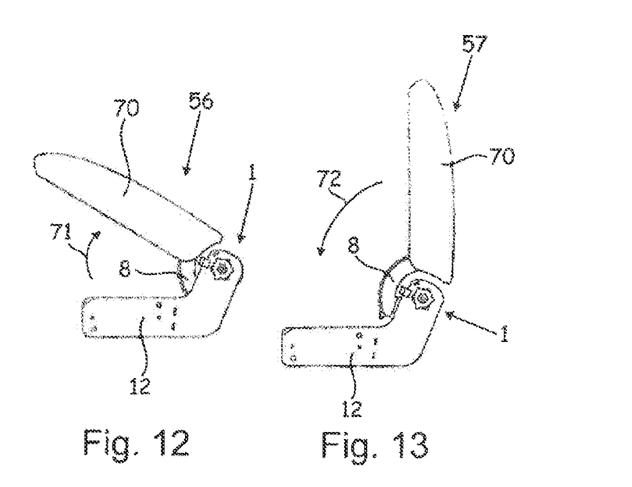
FIG. 12 is a further diagrammatic side view of the vehicle armrest with the continuous inclination adjustment means in the locking position according to FIGS. 6 and 7.
FIG. 13 is a further diagrammatic side view of the vehicle armrest with the continuous inclination adjustment means in the return position according to FIGS. 8 and 9

In the specific embodiment shown in FIGS. 11 to 13 a pivotable vehicle armrest 70 is equipped with the continuous inclination adjustment means 1 according to the invention.

The pivotable vehicle armrest 70 shown in FIG. 11 is still in a starting position 55, in which the continuous inclination adjustment means 1 has an angle of inclination 55A of 0° as shown in FIGS. 4 and 5.

The pivotable vehicle armrest 70 shown in FIG. 12 is pivoted upwards in a first pivoting direction 71 and is accordingly locked in one of the possible locking positions 56, in which the continuous inclination adjustment means 1 has an angle of inclination 56A of 65° as shown in FIGS. 6 and 7.

The pivotable vehicle armrest 70 shown in FIG. 13 is now already in a return position 57 in which the continuous inclination adjustment means 1 has an angle of inclination 57A of 85° or more as shown in FIGS. 8 and 9. When the pivotable vehicle armrest 70 has reached the return position 57, the two sleeve freewheel devices 31 and 32 are released by the control device 34 and the coupling device 36 and the pivotable vehicle armrest 70 can be pivoted into the starting position 55 again contrary to the first pivoting direction 71, i.e. in an opposed pivoting direction 72.

It is to be understood that the pivoting directions 71 and 72 indicated here also formulate the pivoting movements of the two pivot arms 7 and 8.

It is to be understood that the embodiment explained above is merely a first implementation of the continuous inclination adjustment means according to the invention. In this respect the implementation of the invention is not restricted to this embodiment.

All the features disclosed in the application documents are claimed as being essential to the invention, insofar as they are novel either individually or in combination as compared with the prior art.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An apparatus for continuous inclination adjustment of a component part of a vehicle, comprising:
    a pivot axle;
    a sleeve freewheel device for setting the continuous inclination about the pivot axle;
    a coupling device for coupling and uncoupling the sleeve freewheel device; and
    a control device for actuating the coupling device, wherein the control device comprises a control disc and is configured to lock an angle of inclination in a first pivoting direction and the control disc is rotatable about the pivot axle to unlock the angle of inclination when a predetermined angle of inclination is met, wherein the control device is arranged outside the coupling device and the control disc is not displaceable axially along the pivot axle.

2. The continuous inclination adjustment apparatus according to claim 1, wherein the sleeve freewheel device, the coupling device and the control device are arranged axially adjacent to one another along the pivot axle.

3. The continuous inclination adjustment apparatus according to claim 1, wherein
    the sleeve freewheel device comprises a set of radially locking teeth;
    the coupling device comprises a set of axially locking teeth, and
    the set of radially locking teeth and the set of axially locking teeth act in opposed rotary locking directions.

4. The continuous inclination adjustment apparatus according to claim 1, wherein
    the coupling device has a set of axially locking teeth having a first coupling element with spur toothing and with a second coupling element with spur toothing, and
    the two coupling elements are mounted along the pivot axle in such a way that the two coupling elements are capable of being axially separated from each other by means of the control device.

5. The continuous inclination adjustment apparatus according to claim 4, wherein
    the first coupling element with spur toothing further comprises a coupling sleeve acted upon by a spring and mounted so as to be axially displaceable along the pivot axle, and
    the control device is mounted at least in part on the axially displaceable coupling sleeve.

6. The continuous inclination adjustment apparatus according to claim 4, wherein
    the second coupling element with spur toothing further comprises a coupling sleeve fixed axially to the pivot axle, and
    the sleeve freewheel device is mounted on the axially fixed coupling sleeve.

7. The continuous inclination adjustment apparatus according to claim 1, wherein
    the control disc has a plurality of axially projecting wedge elements,
    the coupling device further comprises an axially displaceable coupling element having a plurality of wedge grooves, and
    the plurality of axially projecting wedge elements of the control disc are configured to communicate with the wedge grooves of the axially displaceable coupling element.

8. The continuous inclination adjustment apparatus according to claim 1, wherein the control device further comprises:
    the control disc having a control groove arranged radially and extending in a peripheral direction of the control disc;
    an entrainment cam; and
    wherein a length of the control groove in the peripheral direction of the control disc pre-sets an angle of inclination of the pivotable component part of the vehicle.

9. The continuous inclination adjustment apparatus according to claim 1, further comprising an outer sleeve, and wherein
    the coupling device further comprises a coupling sleeve, and
    the at least one sleeve freewheel device is arranged between the outer sleeve of the apparatus and the coupling sleeve of the coupling device.

10. An apparatus for continuous inclination adjustment of a component part of a vehicle, comprising:
    a pivot axle;
    a sleeve freewheel device for setting the continuous inclination about the pivot axle;
    a coupling device for coupling and uncoupling the sleeve freewheel device; and
    a control device for actuating the coupling device, wherein the control device comprises a control disc and is configured to lock an angle of inclination in a first pivoting direction and the control disc is rotatable about the pivot axle to unlock the angle of inclination when a predetermined angle of inclination is reached or exceeded so that the pivotable component part of the vehicle can be moved back into a starting position contrary to the first pivoting direction, wherein the control device is arranged outside the coupling device the control disc is not displaceable axially along the pivot axle.

11. The continuous inclination adjustment apparatus according to claim 10, wherein the sleeve freewheel device, the coupling device and the control device are arranged axially adjacent to one another along the pivot axle.

12. The continuous inclination adjustment apparatus according to claim 10, wherein
the sleeve freewheel device comprises a set of radially locking teeth;
the coupling device comprises a set of axially locking teeth, and
the set of radially locking teeth and the set of axially locking teeth act in opposed rotary locking directions.

13. The continuous inclination adjustment apparatus according to claim 10, wherein
the coupling device has a set of axially locking teeth having a first coupling element with spur toothing and with a second coupling element with spur toothing, and
the two coupling elements are mounted along the pivot axle in such a way that the two coupling elements are capable of being axially separated from each other by means of the control device.

14. The continuous inclination adjustment apparatus according to claim 13, wherein
the first coupling element with spur toothing further comprises a coupling sleeve acted upon by a spring and mounted so as to be axially displaceable along the pivot axle, and
the control device is mounted at least in part on the axially displaceable coupling sleeve.

15. The continuous inclination adjustment apparatus according to claim 13, wherein
the second coupling element with spur toothing further comprises a coupling sleeve fixed axially to the pivot axle, and
the sleeve freewheel device is mounted on the axially fixed coupling sleeve.

16. The continuous inclination adjustment apparatus according to claim 10, wherein
the control disc has a plurality of axially projecting wedge elements,
the coupling device further comprises an axially displaceable coupling element having a plurality of wedge grooves, and
the plurality of axially projecting wedge elements of the control disc are configured to communicate with the wedge grooves of the axially displaceable coupling element.

17. The continuous inclination adjustment apparatus according to claim 10, wherein the control device further comprises:
the control disc having a control groove arranged radially and extending in a peripheral direction of the control disc;
an entrainment cam; and
wherein a length of the control groove in the peripheral direction of the control disc pre-sets an angle of inclination of the pivotable component part of the vehicle.

18. The continuous inclination adjustment apparatus according to claim 10, further comprising an outer sleeve, and wherein
the coupling device further comprises a coupling sleeve, and
the at least one sleeve freewheel device is arranged between the outer sleeve of the apparatus and the coupling sleeve of the coupling device.

19. A pivotable vehicle armrest configured for continuous inclination adjustment, comprising:
a pivot axle movably connected to the vehicle armrest;
a sleeve freewheel device for setting the continuous inclination about the pivot axle;
a coupling device for coupling and uncoupling the sleeve freewheel device; and
a control device for actuating the coupling device, wherein the control device comprises a control disc and is configured to lock an angle of inclination in a first pivoting direction and the control disc is rotatable about the pivot axle to unlock the angle of inclination when a predetermined angle of inclination is met, wherein the control device is arranged outside the coupling device and the control disc is not displaceable axially along the pivot axle.

20. The pivotable vehicle armrest according to claim 19, wherein the sleeve freewheel device, the coupling device and the control device are arranged axially adjacent to one another along the pivot axle.

* * * * *